US006186463B1

(12) United States Patent
Williams et al.

(10) Patent No.: US 6,186,463 B1
(45) Date of Patent: Feb. 13, 2001

(54) RIB CLAMPING SYSTEM FOR DISPLAY DEVICES

(75) Inventors: Jeffrey A. Williams; Grant D. Dicke, both of Downers Grove; James George Kokenes, Westmont, all of IL (US)

(73) Assignee: Dicke Tool Company, Downers Grove, IL (US)

( * ) Notice: Under 35 U.S.C. 154(b), the term of this patent shall be extended for 0 days.

(21) Appl. No.: 09/369,567

(22) Filed: Aug. 6, 1999

(51) Int. Cl.[7] .................... F16M 11/00

(52) U.S. Cl. .................... 248/413; 40/612; 40/607; 40/610

(58) Field of Search .................... 40/607, 610, 612; 248/316.4, 405, 413

(56) References Cited

U.S. PATENT DOCUMENTS

| | | | |
|---|---|---|---|
| 403,698 | 5/1889 | Rector . | |
| 1,854,478 | 4/1932 | Meyers . | |
| 3,171,626 | 3/1965 | Keats . | |
| 3,200,786 | 8/1965 | Swezy et al. . | |
| 3,620,496 | 11/1971 | Bolt et al. . | |
| 3,847,335 | 11/1974 | Ross . | |
| 3,899,843 | 8/1975 | Doyle et al. . | |
| 4,309,836 | 1/1982 | Knapp . | |
| 4,433,935 | 2/1984 | Main et al. . | |
| 4,662,305 | 5/1987 | Cline . | |
| 4,715,488 * | 12/1987 | Hewitt et al. | 248/413 |
| 4,865,288 | 9/1989 | Dicke et al. . | |
| 4,886,232 | 12/1989 | Dicke et al. | 248/576 |
| 4,954,008 | 9/1990 | Dicke et al. . | |
| 4,980,984 | 1/1991 | Kulp et al. | 40/610 |
| 5,181,335 | 1/1993 | Todd | 40/607 |
| 5,318,258 | 6/1994 | Lang | 248/166 |
| 5,927,670 * | 7/1999 | Hsieh | 248/405 |

FOREIGN PATENT DOCUMENTS

| | | |
|---|---|---|
| 72532 | 9/1947 | (NO) . |

* cited by examiner

*Primary Examiner*—Cassandra H. Davis
(74) *Attorney, Agent, or Firm*—Fitch, Even, Tabin & Flannery

(57) ABSTRACT

A releasable coupling assembly for support ribs associated with sign panels, and the like elongated support members. Force generated by a knob and threaded shaft is applied to a pressure plate through a lever arm. The lever arm is arranged so as to provide a reduced mechanical advantage which limits applied force to the rib. The lever arm may also be made resilient to limit force applied to a rib being clamped.

18 Claims, 5 Drawing Sheets

RIB CLAMPING SYSTEM FOR DISPLAY DEVICES

BACKGROUND OF THE INVENTION

1. Field of the Invention

The present invention is directed to systems for clamping ribs such as those employed in highway signs and other display devices.

2. Description of the Related Art

Highway warning signs are typically employed at roadside locations to warn oncoming traffic of unexpected obstructions and other hazardous conditions associated with work site activity. These types of roadway signs are typically transported to a job site on an as-needed basis.

Improvements in warning signs have been sought to make the signs light weight and collapsible so as to be easily transported along with other equipment in a work vehicle. Presently, many of the warning signs in use today have sign panels supported either by fiberglass ribs or hollow metallic tubing. The fiberglass ribs and metallic tubing have differing handling requirements, especially when subjected to clamping forces. Whereas the metallic tubing is virtually impervious to normal manually applied clamping forces, much greater care must be exercised when clamping fiberglass ribs.

Typically, commercially available fiberglass ribs comprise an array of fiberglass strands encapsulated in a resin body to form the characteristic elongated cross-sectional profile where the large face of the rib is more than three times the dimension of the smaller rib face. If clamping pressure is not properly applied to the fiberglass rib, there is a risk that the fiberglass rib will suffer a loss of structural integrity resulting eventually in the fiberglass strands separating from one another. The initial onset of such problems may build slowly, not becoming apparent until the ribs have been subjected to repeated clamping and unclamping operations. Accordingly, the process of deterioration may not be closely observed with respect to the clamping operations applied to the rib over its useful service life.

SUMMARY OF THE INVENTION

It is an object of the present invention to provide an improved clamping arrangement providing attachment to fiberglass ribs.

Another object of the present invention is to provide such clamping arrangements which may be economically constructed from a minimum number of inexpensive parts.

A further object of the present invention is to provide clamping arrangements of the above-described type which are simply and easily implemented even in adverse field conditions.

These and other objects according to principles of the present invention are provided in a releasable coupling assembly for clamping a rib, comprising:

a mounting channel for receiving the rib;

a press plate movably mounted for movement toward and away from said channel for clamping said rib in said channel and releasing said rib from said channel, respectively;

an operating member for applying force; and a lever arm coupling said operating member and said press plate to move said press plate toward and away from said channel.

In one embodiment, the operating member is made flexible to further limit a compressive force which can be applied to the rib.

DETAILED DESCRIPTION OF THE PREFERRED EMBODIMENTS

Figures 1, 2, 3:
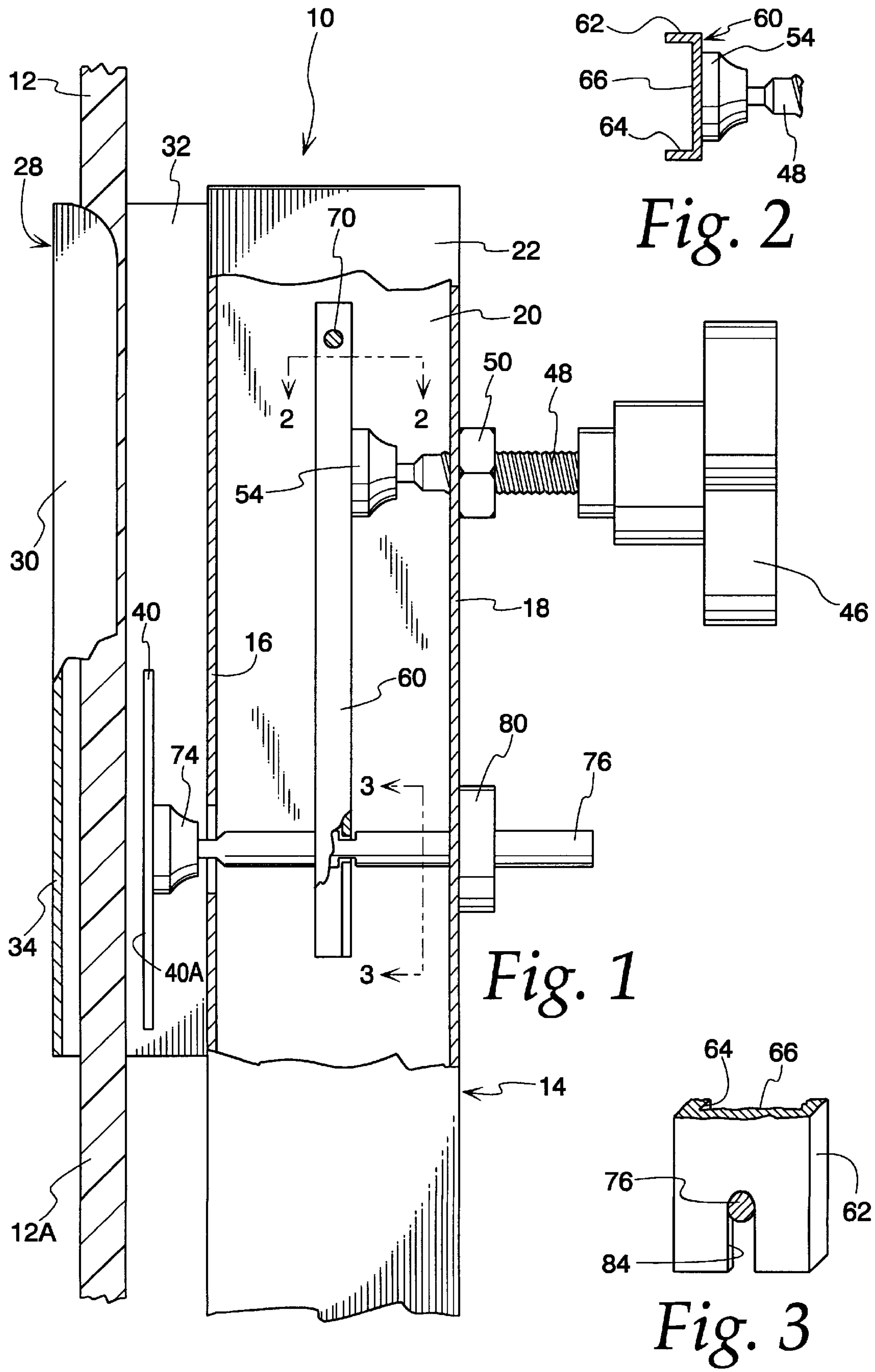
FIG. 1 is a side elevational view, shown partly broken away, of a clamping arrangement according to the principles of the present invention.
FIG. 2 is a cross-sectional view taken along the line 2—2 of FIG. 1.
FIG. 3 is a cross-sectional view taken along the line 3—3 of FIG. 1.
Figure 4:
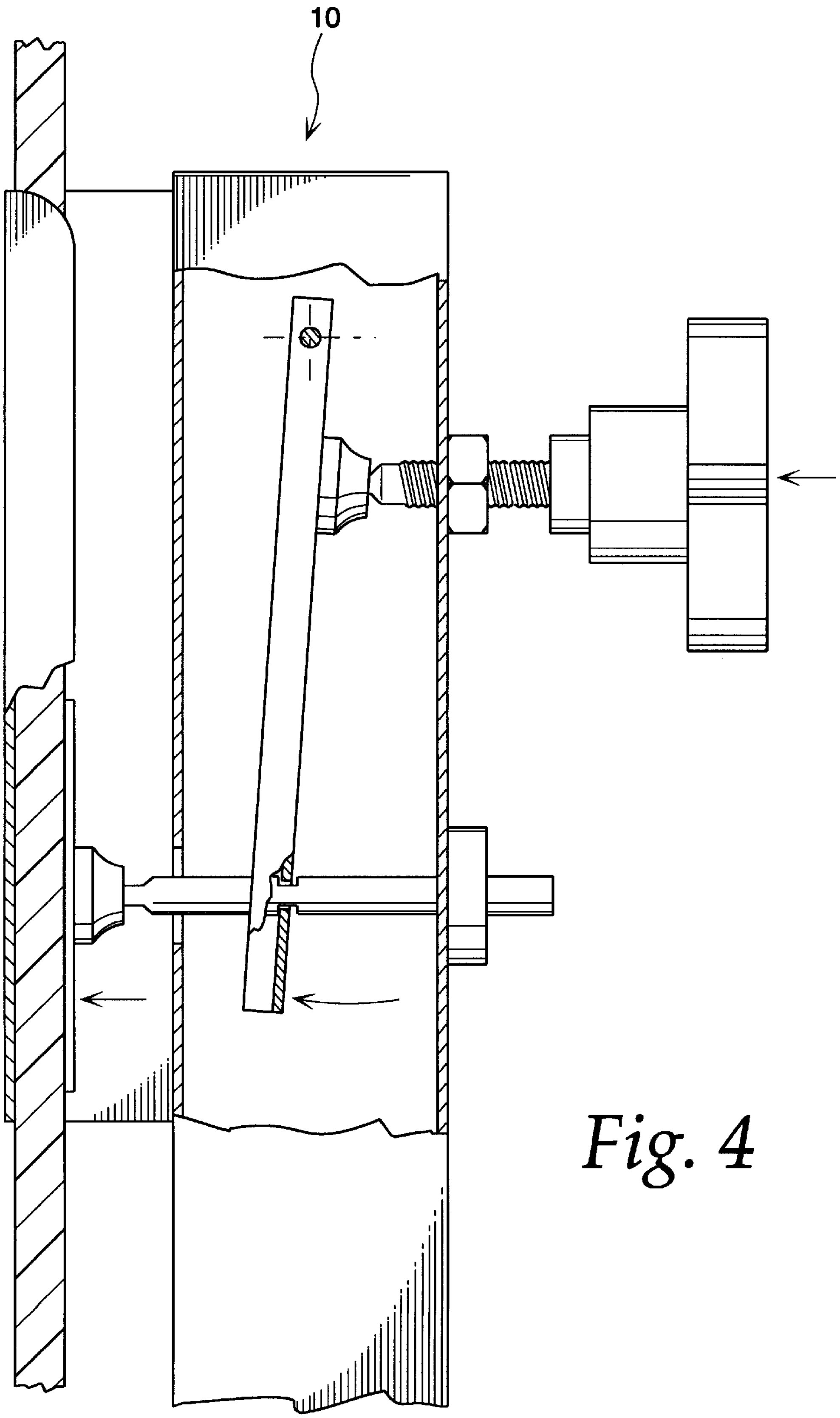
FIG. 4 is a view similar to that of FIG. 1 showing the clamping arrangement in operation.

Referring now to the drawings, and initially to FIGS. 1–4, a releasable coupling assembly is generally indicated at 10. The coupling assembly 10 is shown for use with a fiberglass rib 12 of the type which supports flexible sign panels, such as those employed at roadside locations to provide advance warning of nearby work site activity. As will be appreciated from studying the coupling assembly described herein, rib 12 could be replaced with any number of elongated structural members, such as wooden slats, aluminum tubing, or lengths of structural steel having a variety of cross sections. Further, the coupling assembly described herein could also be readily employed with members having a circular cross section, such as flag poles, for example.

Coupling assembly 10 includes a body 14, preferably in the form of a hollow tubular member having a square cross-section. Body 14 has opposed forward and rearward walls 16, 18 and sidewalls 20, 22. As can be seen in FIG. 1, for example, there are a number of cooperating components located internal as well as external to body 14. In the preferred embodiment, body 14 is formed of conventional tubular steel, although a number of other materials and cross-sectional shapes could be used for body 14. When employed as a roadside warning system, it has been found helpful to enclose moving components, shielding them from salt, dirt and other contamination which may be stirred up by traffic passing the work site. In the preferred embodiment, body 14 is made hollow so as to enclose working components to be described herein.

As can be seen in FIG. 1, rib 12 is nested within a mounting channel 28 having end walls 30,32 and an intermediate wall 34 against which a major face 12*a* of the rib is pressed. In the preferred embodiment, the sidewall 32 is secured to sidewall 20 of body 14 using conventional fastening means, preferably a welded joinder. In the preferred embodiment, body 14 is secured to a ground-engaging base (not shown) so as to assume a self-standing upright position. As mentioned, rib 12 in the preferred embodiment comprises a fiberglass rib providing a vertical support for a conventional flexible sign panel (not shown). The present invention also contemplates a coupling between a body member, such as the square tubing 14 shown in FIG. 1 and an elongated member such as the rib 12 shown in the same figure. Other uses for the coupling assembly are possible. For example, sign stand assemblies are sometimes provided with adapters so that one type of ground support can be engaged with different types of upright sign supports. For example, the rib 12 could extend below body member 14 to a ground-engaging support, with a coupling assembly 10 providing a convenient transition to a rigid tubular upright system.

As mentioned, body 14 is preferably hollow and can be dimensioned to telescopically receive a slightly smaller tubing functioning as an upright support, such as a vertical sign panel support member, In another alternative, rib 12 could comprise a spring member extending above a ground-engaging base. A rib-shaped spring member could be made of conventional metal or non-metallic laminate constructions, for example. Such elongated spring members would be less expensive and weigh less than sets of conventional coil springs which are found in many existing sign stand assemblies.

Releasable coupling assembly 10 provides a carefully defined engagement with rib 12. For example, engagement systems could be provided which encircle rib 12 with a girdling constriction. As a further possibility, a pair of opposed jaws could be made to engage opposed faces of rib 12 with both jaws being drawn toward one another, so as to pinch the rib therebetween. The preferred embodiment of the present invention employs a different type of engagement where the rib is compressed between a stationary support surface (herein the intermediate channel wall 34) and a movable press plate 40 having a pressing surface 40*a* disposed generally parallel to the intermediate channel wall 34. This type of arrangement has been found to provide substantial advantages in at least two different respects. First, it has been found important to control the surface abrasion which results when clamping forces are applied to fiberglass ribs. In this type of rib, a plurality of reinforcing strands are oriented along the length of the rib, being encapsulated within a matrix which is susceptible to mechanical deterioration. The coupling assembly of the present invention also provides improved protection of the rib while allowing the performance needed under conditions which cause rib 12 to vibrate.

It has been found important to provide a continuous stationary support for one face of rib 12, preferably a major face of the fiberglass rib. By continuously supporting a major face of the fiberglass rib with a stationary support surface or wall, a maximum protection against deterioration of the rib surface contacting the support wall is provided.

It is important that the clamping pressure applied to the face of the rib opposite the support wall is adequate to support the coupling engagement against static as well as vibrational forces, such as those associated with gusting wind conditions. The clamping pressure should not be so great, however, that the exposed rib face is subjected to forces by members which might intrude into the matrix of rib 12 or otherwise cause the mechanical integrity of the rib to degrade.

Referring to FIGS. 1–4, the releasable coupling assembly 10 includes a manually graspable knob 46 carried on a threaded shaft 48. Shaft 48 threadingly engages body 14. In the preferred embodiment, a threaded nut fastener 50 is secured to body wall 18 with a welded joinder. Other conventional types of engagement between shaft 48 and body 14 can also be employed. Threaded shaft 48 of the preferred embodiment carries a swivel-mounted pad 54 at its free end, with the forward face of pad 54 contacting a channel-shaped lever arm 60. Referring briefly to FIG. 2, lever arm 60 has a U-cross-sectional shape with sidewalls

62, 64 and an intermediate wall 66 contacted by pad 54. Pad 54 is connected by a conventional ball and socket arrangement (not shown) with threaded shaft 48.

Referring again to FIG. 1, lever arm 60 is pivotally mounted at its upper end to the sidewalls 20, 22 of body 14. Preferably, a pivot pin 70 extends through the upper arm of lever arm 60 to provide the pivotal mounting with opposed walls 20, 22.

In the preferred embodiment, press plate 40 is fixedly joined to a mounting pad 74 which is swivel mounted (with a conventional ball and socket arrangement, not shown) to mounting shaft 76. The forward end of mounting shaft 76 is, as mentioned, swivel coupled to press plate 40. As can be seen in FIG. 1, the opposed rearward end of mounting shaft 76 is slidably supported in a conventional journal member 80. The journal member preferably has a mounting portion in the shape of a conventional washer which is secured to wall 18 of body 14 by welding or the like conventional attachment means.

As shown in FIG. 1, the lower end of lever arm 60 is linked to mounting shaft 76 so that, as the lever arm 60 is pivotally swung toward the rib, press plate 40 will in turn be advanced toward the rib, for pressing engagement therewith. As shown in the cut-away portion toward the bottom of FIG. 1, lever arm 60 and mounting shaft 76 are coupled together by inter-connected notched portions such that the lever arm and mounting shaft 76 are captively engaged one with another. As shown in FIG. 3, the lower end of lever arm 60 is slotted at 84 so as to receive a reduced cross-sectional portion of mounting shaft 76.

In the preferred embodiment, pad 54 is permanently joined to lever arm wall 66 by welding or other securement. Thus, as knob 46 is turned so as to extract threaded shaft 48 from the interior of body 14, the upper end of lever arm 60 is moved toward body wall 18, that is, in a rearward direction away from rib 12. Due to the coupling of lever arm 60 and mounting shaft 76, mounting shaft 76 is moved in a rearward direction, causing press plate 40 to move away from rib 12. As shown in the figures, mounting pad 54 is fixedly engaged with lever arm 60 and the lever arm is inter-locked with the mounting shaft 76. If desired, as an alternative, the rearward movement of press plate 12 could be made to be a permissible rather than a positive operation. For example, pad 54 would not be joined to lever arm 60 and the recessed portion of mounting shaft 76 could be elongated along the axis of the mounting shaft so as to allow a freedom of movement of press plate 40.

When clamping pressure is desired, knob 46 is rotated in a direction so as to move threaded shaft 48 within the interior of body 14, causing lever arm 60 to move to the left, that is, toward rib 12. Since lever arm 60 is pivotally connected at its upper end, the bottom end of the lever arm is also moved to the left, bringing press plate 40 into engagement with rib 12. Eventually, rib 12 is compressed between press plate 40 and channel wall 34. As mentioned, it has been found important that the wall 34 be made stationary with respect to press plate 40 and that the clamping action be applied to rib 12 in the manner shown so as to avoid mechanical degradation of the rib.

As can be seen in FIG. 1, the force applying operator (herein comprised of knob 46, threaded shaft 48 and swivel-mounted pad 54) is located along lever arm 60 so as to be closer to pivotal mounting 70 than the interconnection with mounting shaft 76. As a result, the mechanical advantage which can be applied to the lever arm is limited in a carefully defined manner controlled by the manufacturer. The amount of torque which can be applied to knob 46 by a human operator's manual grasp can be determined empirically or perhaps by reference to previous studies. By carefully selecting the thread pitch of shaft 48 and the attachment position of mounting pad 54 along lever arm 60, the maximum compression applied to the rib member can be reliably defined, i.e., limited by the manufacturer of the coupling assembly.

In the preferred embodiment illustrated in the figures, the length of press plate 40 is less than half the length of channel wall 34 contacted by rib 12, and the press plate is disposed adjacent one end of channel wall 34. These relative arrangements can be varied as desired to provide, for example, operation optimized for static conditions, or for vibrating conditions, or for a compromise operation yielding satisfactory performance results under both stationary and vibrational conditions.

The arrangements illustrated in the figures have been found to provide improved performance for fiberglass rib, flexible sign panels of the type sold by the assignee of the present invention under the name SCREWLOCK™. Improved protection for conventional fiberglass ribs was provided, while offering satisfactory clamping in both static and gusting wind load conditions applied to sign panels according to the present invention. Performance results have been especially improved in conditions where the rib is aligned for repetitive clamping operations. Such an arrangement is illustrated, for example, in FIG. 5 where an end support extends from body 14 to engage the lower end of rib 12. In arrangements of this type, the press plate 40 engages substantially the same identical portion of rib 12 with every clamping operation, in effect amplifying any rib degradation which might result from the clamping operation. Such alignment arrangements are commercially important, especially for warning signs in which the sign legend is mandated by regulation to be positioned at a certain height above grade.

Figure 5:
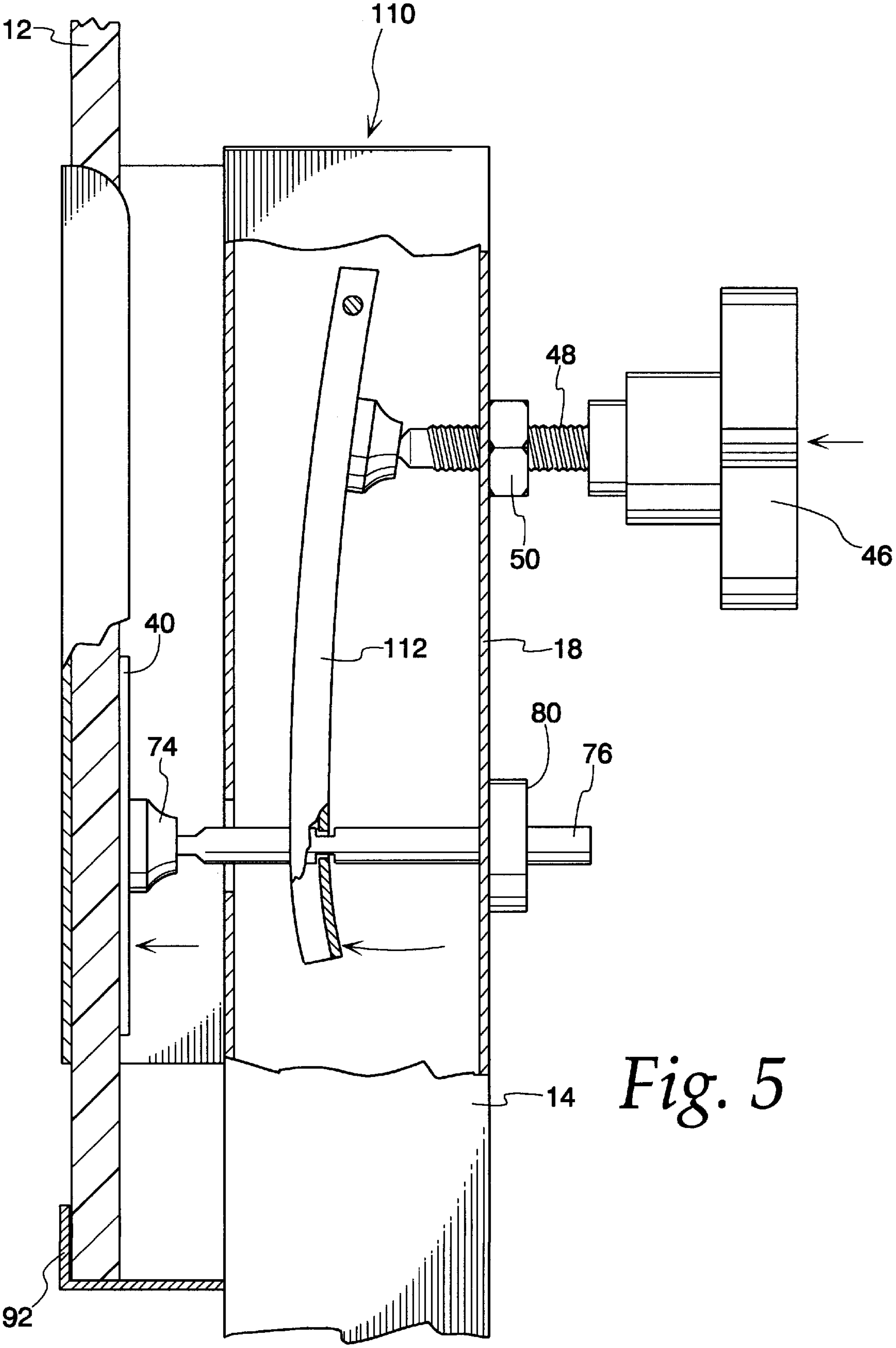
FIG. 5 is a view similar to that of FIG. 4 but showing an alternative lever arm arrangement.

Turning now to FIG. 5, an optional coupling assembly is generally indicated at 110. In the coupling assembly 110 the lever arm is made to be resiliently deflectable as illustrated in FIG. 5. As indicated in FIG. 5, the cross-section of lever arm 112 is substantially the same as that of the rigid lever arm 60. In the preferred embodiment illustrated in FIG. 5, lever arm 12 has a different material composition from that of lever arm 60, allowing the lever arm 112 to exhibit a resilient deflection under the application of the same forces as those applied in FIGS. 1–4. Preferably, substantial resilient deflection of lever arm 112 is made to occur only when maximum compression force is applied to rib 12 by press plate 40, with any additional rotation of knob 46 resulting in deflection of lever arm 112, rather than an over pressure applied to rib 12. In the most preferred embodiment, substantial deflection of lever arm 112 is associated only with the application of above average torque which can be applied by manually grasping knob 46. Thus, the resilient lever arm 112 can be made to provide protection under abusive conditions where knob 46 is turned with a wrench, rather than by hand. As a further alternative, a compression spring can be installed within the interior of tube 14 at a point adjacent the lower free end of the lever arm. The compression spring would be located between the front wall 16 and the lower free end of the lever arm. Under maximum applied force conditions, the coil spring would absorb forces generated by the lever arm which otherwise would be transmitted to the press plate.

If desired, mounting shaft 76 can be coupled to mounting pad 74 by a compression spring having a spring constant chosen such that spring deflection occurs after a desired maximum clamping pressure has been reached. In this manner, the maximum compressive force applied to rib 12 can be limited to an approximate level by selection of the spring constant. The same principle can be applied to the lever arm 112 illustrated in FIG. 5 where resilient deflection of the lever arm is expected to occur with each clamping operation. With appropriate selection of the spring constant of lever arm 112, compression forces applied to rib 12 can be limited to an acceptable range associated with the spring deflection of lever arm 112.

Figure 6:
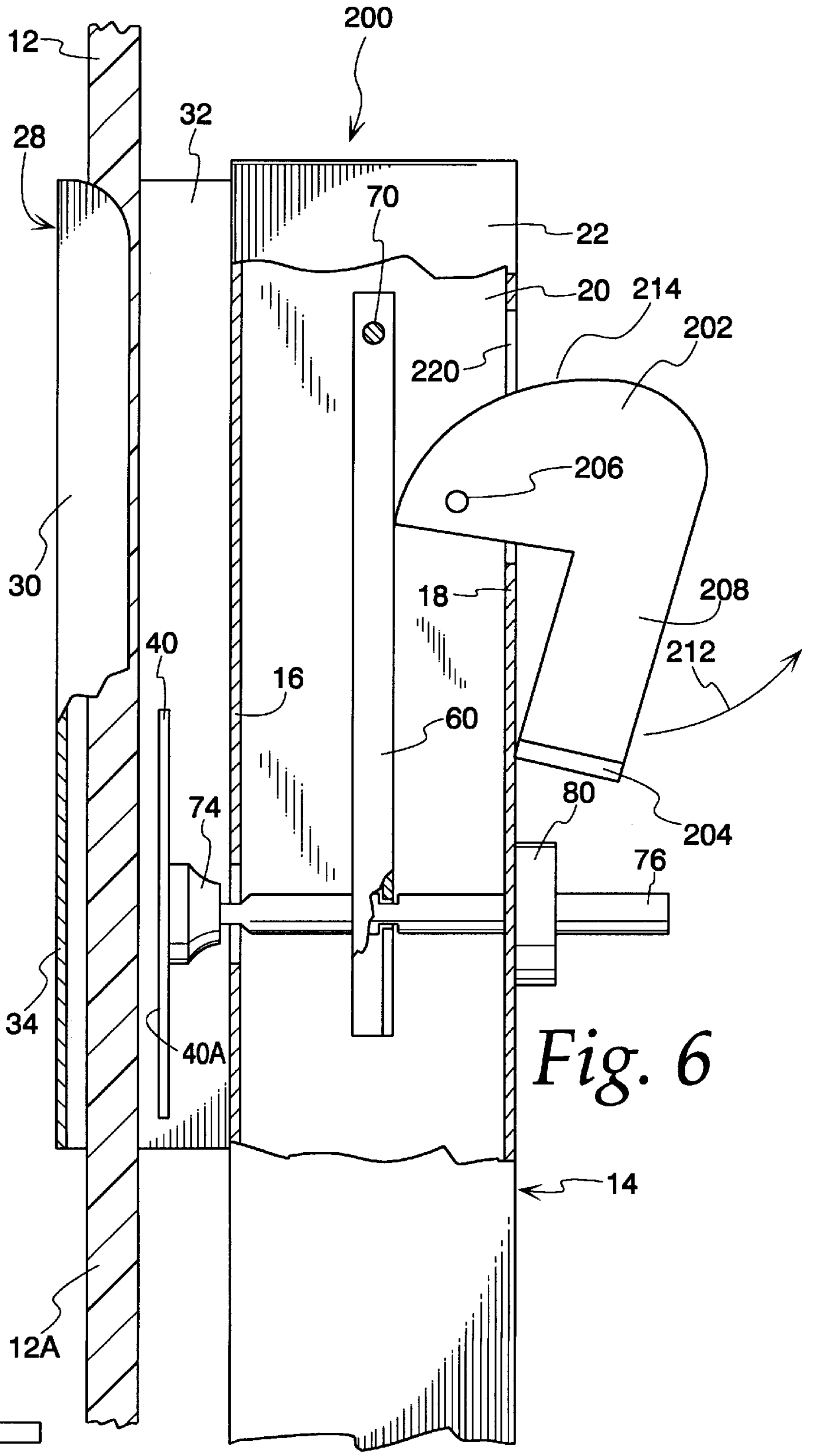
FIG. 6 is a side elevational view, shown partly broken away, of a clamping arrangement employing a cam actuator.
Figure 7:
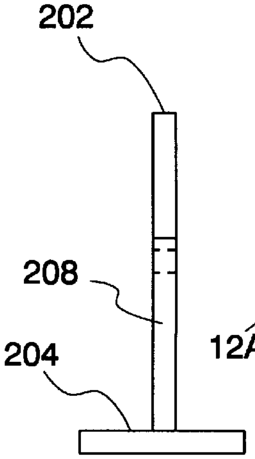
FIG. 7 is a side view of the cam actuator.

Referring now to FIGS. 6 and 7, an alternative releasable coupling assembly is generally indicated at 200. As indicated by the common reference numerals, the releasable coupling assembly of FIG. 6 shares many of the features of the releasable coupling assembly described above with reference to FIG. 1. In place of the threaded shaft actuator of FIG. 1, a pivoting cam actuator 202 with an integral handle 204 is employed. The cam 202 is pivotally mounted at 206 to the side walls 20, 22 of tubular member 14. FIG. 7 shows the handle 204 integrally formed with a stem portion 208 of cam 202. In the preferred embodiment, cam 202 is stamped from unitary sheet metal material, as is handle 204. The handle is preferably joined to the cam using welding or other conventional fastening techniques. As the user grasps handle 204, the cam 202 is pivoted in the direction of arrow 212. This action causes cam face 214 to press against the face of lever arm 60. The cam travels within a slot 220 formed in rearward wall 18. If desired, a rolling pin can be installed in lever arm 60 at the point of contact with cam face 214, if a reduction of friction is desired.

Figure 8:
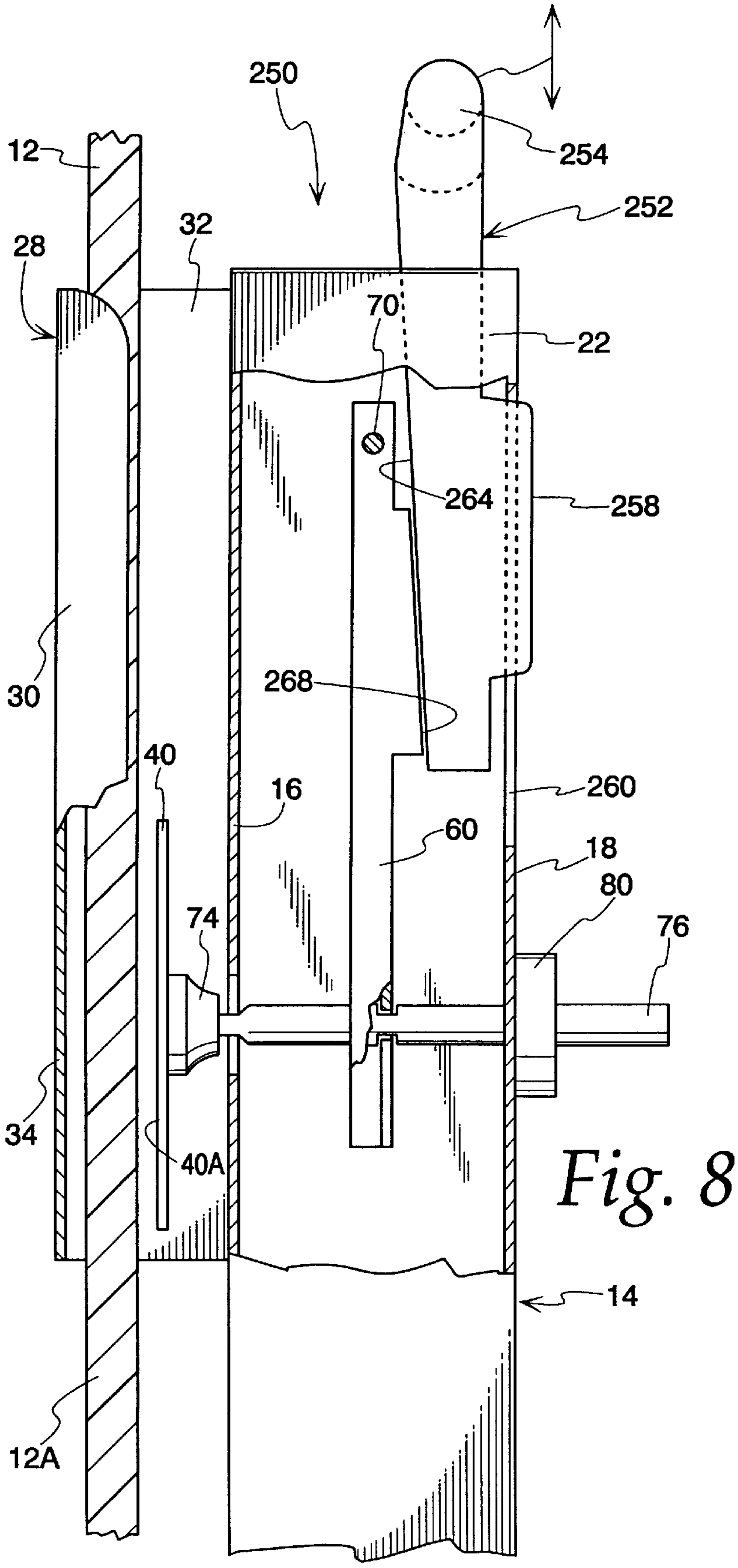
FIG. 8 is a side elevational view, shown partly broken away, of a clamping arrangement incorporating a sliding wedge actuator.

Turning now to FIG. 8, an alternative releasable coupling assembly 250 includes a wedge-shaped actuator 252 operated by a handle portion 254. A guide tab 258 rides in a slot 260 formed in rear wall 18. As actuator 252 is lowered, the cam face 264 of the wedge wipes across contact pad 268 of lever arm 60, causing press plate 40 to advance toward rib 12. If desired, a conventional spring bias can be applied to mounting shaft 76 so as to cause breast plate 40 to retract as wedge actuator 252 is raised.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A releasable coupling assembly for clamping a rib comprising:

a mounting channel for receiving the rib;

a press plate movably mounted for movement toward and away from said channel for clamping said rib in said channel and releasing said rib from said channel, respectively;

an operating member for applying force to said press plate; and a lever arm coupling said operating member and said press plate to move said press plate toward and away from said channel.

2. The releasable coupling assembly of claim 1 wherein said lever arm is double ended and is pivotally mounted at one end, adjacent the operating member.

3. The releasable coupling assembly of claim 1 wherein said press plate is carried at one end of a mounting shaft.

4. The releasable coupling assembly of claim 1 wherein said press plate is pivotally mounted to the mounting shaft.

5. The releasable coupling assembly of claim 1 wherein said channel includes journal means for mounting said mounting shaft.

6. The releasable coupling assembly of claim 1 wherein said lever arm is connected to said mounting shaft with a keyed interlock.

7. The releasable coupling assembly of claim 1 wherein said operating member comprises a manually engageable screw shaft threadingly engaging said channel.

8. The releasable coupling assembly of claim 1 further comprising a pad for engaging said lever arm, pivotally mounted at the end of said screw shaft.

9. The releasable coupling assembly of claim 1 wherein said lever arm has a generally C-shaped cross section.

10. A sign stand assembly, comprising:

a support base;

a rib member for attachment to a sign;

a mounting channel supported by the support base, for receiving the rib;

a press plate movably mounted for movement toward and away from said channel for clamping said rib to said channel and releasing said rib from said channel, respectively;

an operating member for applying force to said press plate;

a resilient lever arm coupling said operating member and said press plate to move said press plate toward and away from said channel, said resilient lever arm deflecting under force of said operating member to limit the clamping force applied by said press plate.

11. The releasable coupling assembly of claim 10 wherein said resilient lever arm is double ended and is pivotally mounted at one end, adjacent the operating member.

12. The releasable coupling assembly of claim 10 wherein said press plate is carried at one end of a mounting shaft.

13. The releasable coupling assembly of claim 10 wherein said press plate is pivotally mounted to the mounting shaft.

14. The releasable coupling assembly of claim 10 wherein said channel includes journal means for mounting said mounting shaft.

15. The releasable coupling assembly of claim 10 wherein said lever arm is connected to said mounting shaft with a keyed interlock.

16. The releasable coupling assembly of claim 10 wherein said operating member comprises a screw shaft threadingly engaging said channel.

17. The releasable coupling assembly of claim 10 further comprising a pad for engaging said lever arm, pivotally mounted at the end of said screw shaft.

18. The releasable coupling assembly of claim 10 wherein said lever arm has a generally C-shaped cross section.

* * * * *